US012615614B2

(12) United States Patent
Li et al.

(10) Patent No.: US 12,615,614 B2
(45) Date of Patent: Apr. 28, 2026

(54) ELECTRONIC DEVICE LOCATIONS INFERENCES

(71) Applicant: Hewlett-Packard Development Company, L.P., Spring, TX (US)

(72) Inventors: Pei Hsuan Li, Taipei City (TW); Janani Anand, Spring, TX (US); Christopher Charles Mohrman, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 277 days.

(21) Appl. No.: 18/558,684

(22) PCT Filed: May 27, 2021

(86) PCT No.: PCT/US2021/034587
§ 371 (c)(1),
(2) Date: Nov. 2, 2023

(87) PCT Pub. No.: WO2022/250675
PCT Pub. Date: Dec. 1, 2022

(65) Prior Publication Data
US 2024/0244565 A1     Jul. 18, 2024

(51) Int. Cl.
*H04W 64/00*          (2009.01)
*G06N 20/10*          (2019.01)
*H04W 84/12*          (2009.01)
(52) U.S. Cl.
CPC ............ *H04W 64/00* (2013.01); *G06N 20/10* (2019.01); *H04W 84/12* (2013.01)

(58) Field of Classification Search
CPC ....... H04W 64/00; H04W 84/12; G06N 20/10
See application file for complete search history.

(56) References Cited

U.S. PATENT DOCUMENTS

| | | | |
|---|---|---|---|
| 9,297,658 B2 | 3/2016 | Bandyopadhyay et al. | |
| 10,680,875 B2 | 6/2020 | Tapia et al. | |
| 10,716,085 B2 | 7/2020 | Annamalai et al. | |
| 10,856,136 B1 | 12/2020 | Espy et al. | |
| 2016/0047662 A1 | 2/2016 | Ricci | |
| 2019/0138719 A1* | 5/2019 | Sultana ................ | G06N 3/0464 |
| 2019/0209022 A1 | 7/2019 | Sobol et al. | |
| 2021/0311208 A1* | 10/2021 | Ohlarik ................. | G01S 19/396 |
| 2022/0034990 A1* | 2/2022 | Yu ......................... | H04W 64/00 |

FOREIGN PATENT DOCUMENTS

| | | |
|---|---|---|
| EP | 2229015 A2 | 9/2010 |
| EP | 3320723 B1 | 5/2020 |
| WO | 2016/138800 A1 | 9/2016 |

* cited by examiner

*Primary Examiner* — Justin Y Lee
(74) *Attorney, Agent, or Firm* — Quarles & Brady LLP

(57)          ABSTRACT

In some examples, an electronic device includes a wireless communication device. In some examples, the electronic device includes a transceiver of the wireless communication device to receive radio frequency (RF) signals. In some examples, the electronic device includes a processor. In some examples, the processor is to generate a data cluster based on the RF signals. In some examples, the data cluster corresponds to a location of the electronic device. In some examples, the processor is to determine a classifier based on the cluster. In some examples, the processor is to infer, via a machine learning model, the location of the electronic device based on the classifier.

14 Claims, 6 Drawing Sheets

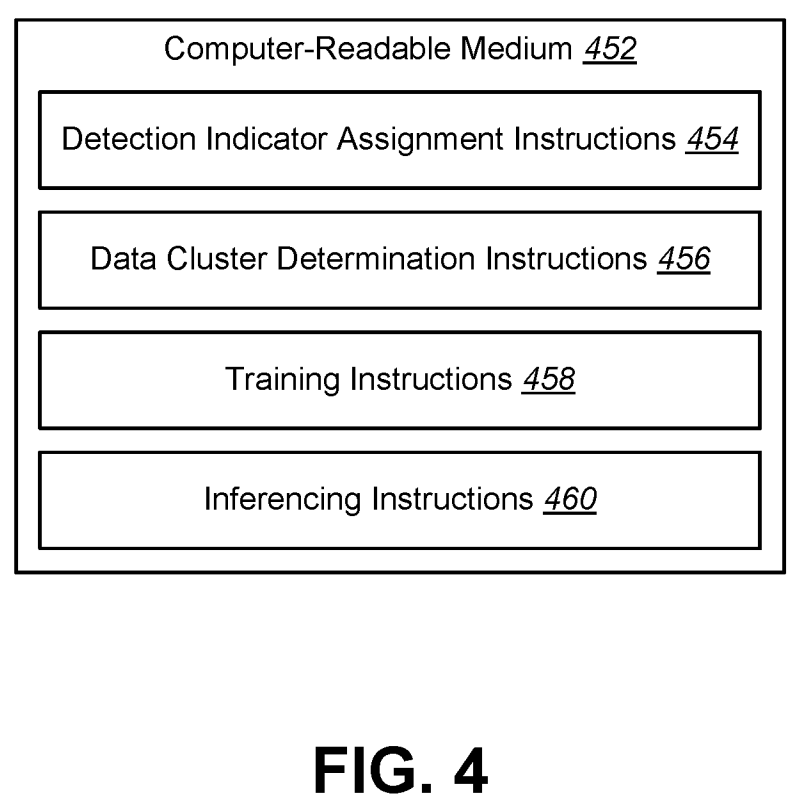

Computer-Readable Medium _452_

Detection Indicator Assignment Instructions _454_

Data Cluster Determination Instructions _456_

Training Instructions _458_

Inferencing Instructions _460_

FIG. 4

Receive a WLAN identifier

502

WLAN identifier received for threshold period?

504

No

Yes

Add the WLAN identifier to an identifier set

506

Determine a fingerprint vector based on the identifier set

508

Generate a data cluster based on the fingerprint vector

510

Train a classifier based on the data cluster

512

Add the classifier to an ensemble model

514

500

ELECTRONIC DEVICE LOCATIONS INFERENCES

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

BRIEF DESCRIPTION OF THE DRAWINGS

FIG. 4 is a block diagram illustrating an example of a computer-readable medium for location inferencing;

DETAILED DESCRIPTION

Figure 1:
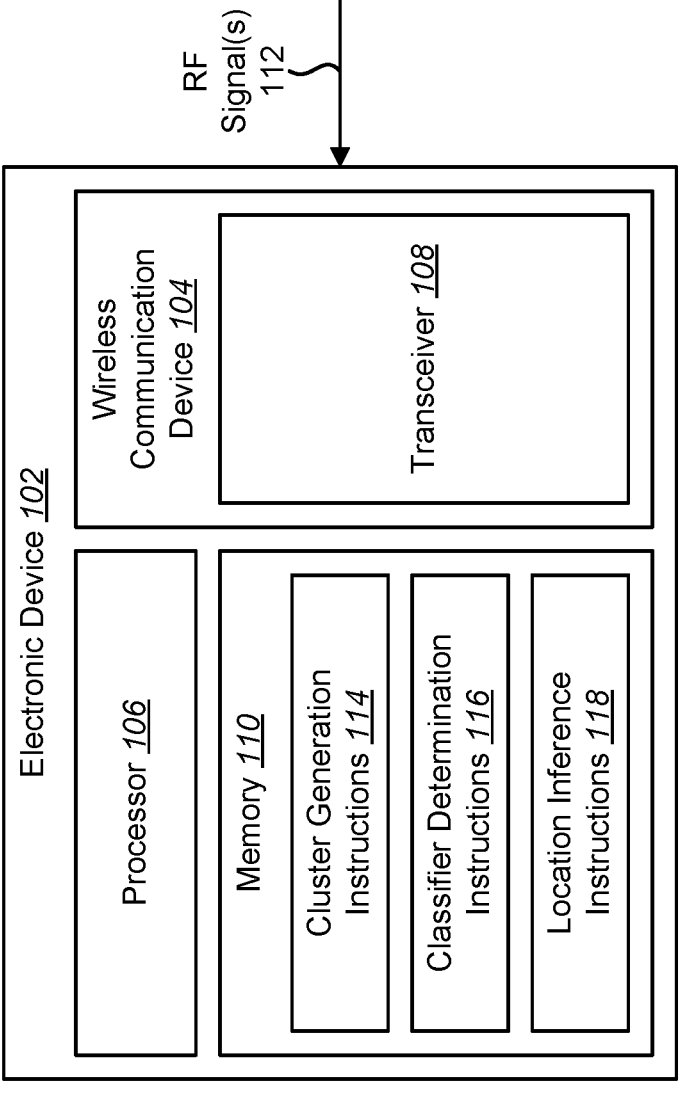
FIG. 1 is a block diagram of an example of an electronic device that may be utilized to produce electronic device location inferences.

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, game consoles, smart appliances, vehicles with electronic components, aircraft, drones, robots, smart appliances, etc.

Recognizing a location of an electronic device may be helpful. For instance, location recognition may enable the electronic device to provide enhanced functionality to a user. Techniques for location recognition are described herein. Some of the techniques described herein may include learning a wireless signal pattern (e.g., signal fingerprint, Wi-Fi fingerprint, etc.) that is specific to a location. Some of the techniques described herein may be performed without prior information about a location.

Throughout the drawings, similar reference numbers may designate similar or identical elements. When an element is referred to without a reference number, this may refer to the element generally, with or without limitation to any particular drawing or figure. In some examples, the drawings are not to scale and the size of some parts may be exaggerated to more clearly illustrate the example shown. Moreover, the drawings provide examples in accordance with the description. However, the description is not limited to the examples provided in the drawings.

FIG. 1 is a block diagram of an example of an electronic device 102 that may be utilized to produce electronic device location inferences. Examples of the electronic device 102 may include, computing devices, laptop computers, desktop computers, smartphones, tablet devices, game consoles, vehicles with electronic components, aircraft, drones, robots, smart appliances, etc. In some examples, the electronic device 102 may perform one, some, or all of the functions, operations, elements, procedures, etc., described in one, some, or all of FIG. 1-6.

In some examples, the electronic device 102 may include or may be coupled to a processor 106, a memory 110, a wireless communication device 104, or a combination thereof. In some examples, the electronic device 102 may include additional components (not shown) or some of the components described herein may be removed or modified without departing from the scope of this disclosure.

In some examples, the electronic device 102 may include an input device, an output device (not shown in FIG. 1), or a combination thereof. Examples of output devices include a display panel, speaker, etc. Examples of input devices include a button, a touch screen, etc. In some examples, the electronic device 102 may be coupled to an external input device(s), an external output device(s), or a combination thereof. In some examples, the electronic device 102 may be coupled to a keyboard, a mouse, a display device, etc., or a combination thereof. In some examples, an input device may be utilized to input instructions or data into the electronic device 102.

In some examples, the electronic device 102 may include a wireless communication device 104. The wireless communication device 104 may be circuitry to communicate radio frequency (RF) signals. In some examples, the wireless communication device 104 may be utilized to communicate with an external device (e.g., router, base station, networked device, server, remote device, etc.). In some examples, the wireless communication device 104 may include a transceiver 108. The transceiver 108 may be circuitry to enable transmission or reception of RF signals. Examples of the transceiver 108 may include a wireless local area network (WLAN) transceiver, Wi-Fi transceiver, cellular transceiver, Bluetooth transceiver, Zigbee transceiver, etc. In some examples, the transceiver 108 may include an antenna, an amplifier (e.g., low-noise amplifier (LNA), power amplifier (PA)), a mixer, a converter (e.g., upconverter, downconverter, etc.), a filter, or a combination thereof.

In some examples, the transceiver 108 may receive an RF signal or signals 112. In some examples, the transceiver 108 may receive an RF signal 112 from a router, base station, remote transmitter, etc., or a combination thereof. In some examples, the electronic device 102 (e.g., transceiver 108) may receive RF signals 112 from a wireless network(s). For instance, the electronic device 102 (e.g., transceiver 108) may periodically scan and receive an RF signal 112 (e.g., Wi-Fi signal(s), Bluetooth signal(s), cell signal(s), etc.). In some examples, a wireless network may serve a relatively fixed area. For example, an electronic device may communicate with a wireless local area network (WLAN), cellular network, etc., using a network device (e.g., access point(s), base station(s), router(s), switch(es), etc.).

In some examples, a network may use a communication protocol. In some examples, a network may utilize an Institute of Electrical and Electronics Engineers (IEEE) 802.11 (Wi-Fi) protocol, cellular (e.g., Long Term Evolution (LTE), New Radio (NR)) protocol, a personal area network (PAN) protocol (e.g., Bluetooth), or a combination thereof. In some examples, other communication protocols may be utilized for a network.

The processor 106 may be circuitry to perform an operation (e.g., logic operation(s), arithmetic operation(s), etc.). Some examples of the processor 106 may include a central processing unit (CPU), a digital signal processor (DSP), a semiconductor-based microprocessor, a field-programmable gate array (FPGA), an application-specific integrated circuit (ASIC), another hardware device, or a combination thereof suitable for retrieval and execution of instructions stored in the memory 110. The processor 106 may fetch, decode, or execute instructions stored in the memory 110. In some examples, the processor 106 may include an electronic circuit(s) that include electronic components for performing a function of the instructions. In some examples, the processor 106 may perform one, some, or all of the aspects, operations, elements, etc., described in one, some, or all of FIG. 1-6.

In some examples, the memory 110 may be an electronic storage device, magnetic storage device, optical storage device, other physical storage device, or a combination thereof that contains or stores electronic information (e.g., instructions, data). In some examples, the memory 110 may be Random Access Memory (RAM), Electrically Erasable Programmable Read-Only Memory (EEPROM), a storage device, an optical disc, the like, or a combination thereof. In some examples, the memory 110 may be volatile memory, non-volatile memory, or a combination thereof. Some examples of the memory 110 may include Dynamic Random Access Memory (DRAM), EEPROM, magnetoresistive random-access memory (MRAM), phase change RAM (PCRAM), memristor, flash memory, the like, or a combination thereof. In some examples, the memory 110 may be a non-transitory tangible machine-readable storage medium, where the term "non-transitory" does not encompass transitory propagating signals. In some examples, the memory 110 may include multiple devices (e.g., a RAM card and a solid-state drive (SSD)).

In some examples, the transceiver 108 may receive an identifier of an RF signal 112. For instance, an RF signal 112 may include or indicate an identifier of a device that transmitted the RF signal 112. Some examples of an identifier may include a service set identifier (SSID), media access control (MAC) address, cell identifier, etc. The processor 106 may store an identifier of the RF signal 112. For instance, the processor 106 may store the identifier in a cache in the memory 110.

In some examples, the processor 106 may discard (e.g., delete, erase, etc.) an identifier of an RF signal 112 that is observed for less than a threshold period. For instance, when an RF signal 112 is initially received, the processor 106 may begin tracking whether the identifier of the RF signal 112 is observed (e.g., received) for a threshold period. Examples of the threshold period may include a period of time (e.g., 10 minutes, 15 minutes, 30 minutes, 1 hour, etc.) and a quantity of periodic scans (e.g., 20 scans, 50 scans, 200 scans, etc.). For example, if the identifier is observed for each periodic scan (or for a threshold proportion (e.g., 80%) of periodic scans) in the threshold period, the identifier may be added to an identifier set. In some examples, if the identifier is observed for less than the threshold period, the processor 106 may discard the identifier. For instance, if the identifier is no longer observed during the threshold period or is not observed for a threshold proportion of scans during the threshold period, the processor 106 may discard the identifier. In some examples, an identifier may be discarded to remove data corresponding to a transient location (e.g., location(s) where the electronic device 102 is not located for a significant quantity of time) or corresponding to a transient network (e.g., transient hotspot networks sourced from mobile devices).

In some examples, the processor 106 may store an identifier of an RF signal 112 associated with a value indicating whether the identifier was observed at a time (e.g., in a scan).

For instance, a value may be set to a '1' indicating that the identifier was observed, or may be set to '0' indicating that the identifier was not observed. In some examples, a value may be set to an observed signal strength measurement (instead of '0' or '1', for instance). The values may provide an indication of a group of devices (e.g., routers, base stations, etc.) that tend to be located near each other. In some examples, values associated with a set of identifiers may be referred to as a fingerprint vector. A fingerprint vector may be denoted F. Each value in a fingerprint vector may correspond to an observed identifier. For instance, each observed identifier r may be used as a feature. A value $F_r$ of the fingerprint vector may be set to 1 if the identifier r was observed at a time (e.g., scan). Otherwise, the value $F_r$ may be set to 0. For example, if 22 unique identifiers are stored in the identifier set, the processor 106 may construct a fingerprint vector with 22 rows. An example of a fingerprint vector is given in FIG. 6.

The memory 110 may include cluster generation instructions 114. The processor 106 may execute the cluster generation instructions 114 to generate a data cluster based on the RF signals 112. A data cluster may correspond to a location of the electronic device 102. In some examples, the location may be indicated in an RF signal domain (e.g., location relative to signal transmitters). For instance, the location may be expressed without geographical information or coordinate location information in some examples.

In some examples, generating the data cluster may be performed using unsupervised clustering. For instance, an unsupervised clustering technique may be applied to fingerprint vectors to identify a location(s). The fingerprint vectors that fall in the same cluster may belong to the same location. Density-based spatial clustering of applications with noise (DBSCAN) is an example of clustering that may be utilized to generate the data cluster. Other examples of clustering techniques may be utilized in some examples. Hyperparameters of a clustering technique may be set according to cluster range. In DBSCAN, for instance, the parameter & may specify a maximum distance allowed for between fingerprint vectors. For example, locating the electronic device 102 at a building scale may utilize a different & value than locating the electronic device 102 on a room scale.

The processor 106 may execute the classifier determination instructions 116 to determine a classifier based on the cluster. The classifier may be a machine learning classifier. Machine learning may be a technique where a machine learning model is trained to perform a task(s) based on a set of examples (e.g., data). For instance, a machine learning model may be trained to classify an input. Training a machine learning model may include determining weights corresponding to structures of the machine learning model. A machine learning classifier may be a weight(s) that may be utilized in a machine learning model to classify an input. For instance, the classifier may be utilized to infer whether an observed identifier (from RF signal(s)) corresponds to a location or cluster. Some examples of the techniques described herein may utilize unsupervised or self-supervised learning.

In some examples, the processor 106 may train a one-class support vector machine (SVM) classifier for the data cluster to determine the classifier. For instance, the processor 106 may utilize the data cluster (with other data clusters corresponding to other locations, for instance) to construct a hyperplane(s) to classify a subsequent input as corresponding to the data cluster (e.g., location) or not.

In some examples, the processor 106 may add the classifier to a machine learning model. For instance, the machine learning model may be an ensemble machine learning model. The machine learning model may include a one-class classifier or multiple one-class classifiers. For example, the machine learning model may be included in the location inference instructions 118.

The processor 106 may execute the location inference instructions 118 to infer, via a machine learning model, the location of the electronic device 102 based on the classifier. For example, when the electronic device 102 is in a location with a corresponding trained classifier, the machine learning model may infer that the electronic device 102 is in a location that the electronic device has been located previously. For instance, a one-class SVM classifier (corresponding to the location) in an ensemble machine learning model may produce an indicator that an observed identifier corresponds to the location.

In some examples, the processor 106 may determine whether the location has a corresponding label. In some examples, a classifier, a cluster, or a combination thereof may be labeled with a name or indicator of the corresponding location. When a data cluster is initially generated or when a classifier is initially trained in some examples, the data cluster, classifier, or corresponding location may be unlabeled.

In some examples, the processor 106 may produce a label request in response to determining that the location does not have a corresponding label. For instance, the processor 106 may determine that the memory 110 does not include a label for a data cluster, classifier, or location when the location is inferred. In some examples, a label request may be a message or signal to a user to request a label for a data cluster, classifier, location, or a combination thereof. For instance, a label request may be a textual notification displayed on a display panel, an audio notification, etc., indicating a request to input a label. When an unlabeled classification (e.g., location) is inferred (e.g., when a user revisits a location without a label), the electronic device 102 may prompt the user with a request such as "What is this place?" For example, a popup window may be displayed that allows a user to input text, a menu may be displayed with label options for selection, or a voice-based notification may request a speech input, etc. Some examples of the techniques described herein may utilize a one-time user interaction to obtain a label for a location (e.g., one-time user interaction per location).

In some examples, the electronic device 102 may include or be coupled to an input device to receive a label. The processor 106 may associate the label with the location. For instance, the electronic device 102 may receive a label via an input device (e.g., touch screen, keyboard, microphone, etc.). In some examples, the processor 106 may associate the label with the cluster, classification, location, or a combination thereof. In some examples, the processor 106 may store the label in a data structure element that is linked to the cluster, classification, location, or a combination thereof.

Figure 2:
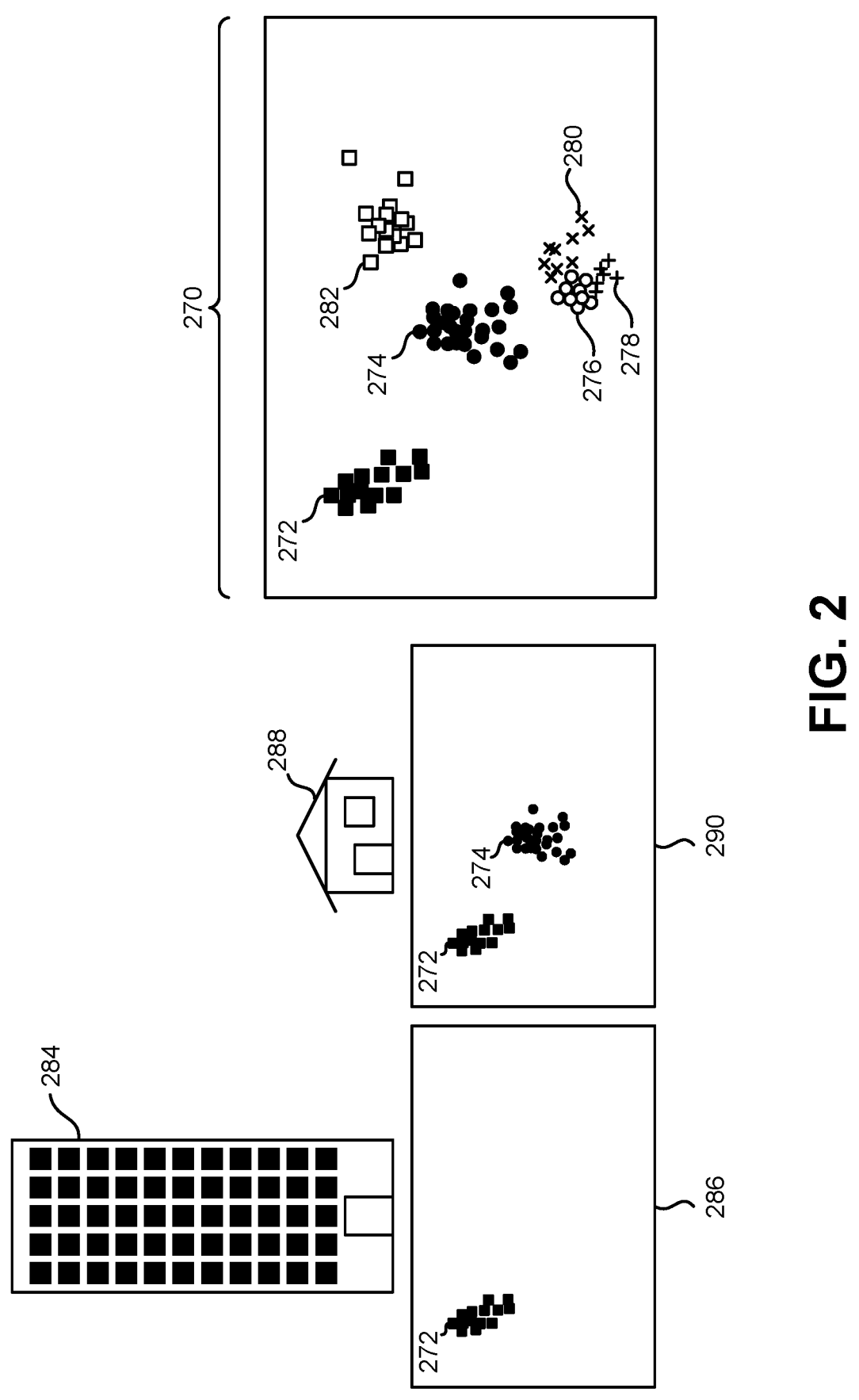
FIG. 2 is a diagram illustrating an example of clusters in accordance with some of the techniques described herein.

FIG. 2 is a diagram illustrating an example of data clusters 270 in accordance with some of the techniques described herein. In the example of FIG. 2, the shapes represent observed identifiers corresponding to different locations. For instance, an electronic device may observe different identifiers from different transmitting devices (e.g., routers) in a variety of locations. Some of the techniques described herein may be utilized to form data clusters corresponding to the different locations over time. For instance, a first data cluster 272 may be formed from observed identifiers at an office location 284 at a first time 286. A second data cluster 274 may be formed from observed identifiers at a home location 288 at a second time 290. Data clusters corresponding to other locations may be added over time. For instance, a third data cluster 276 may be formed from observed identifiers at a café location, a fourth data cluster 278 may be formed from observed identifiers at a bus stop location, a fifth data cluster 280 may be formed from observed identifiers at an airport location, and a sixth data cluster 282 may be formed from observed identifiers at a library location. In some examples, the data clusters may be utilized to train classifiers. The classifiers may be utilized to infer (e.g., recognize) the locations when an electronic device visits the locations.

In some examples, a cluster or location may be removed when the cluster or location has not been observed for a threshold period (e.g., 6 months, a year, etc.). In some examples, a cluster or location may be removed in response to a user input.

Figure 3:
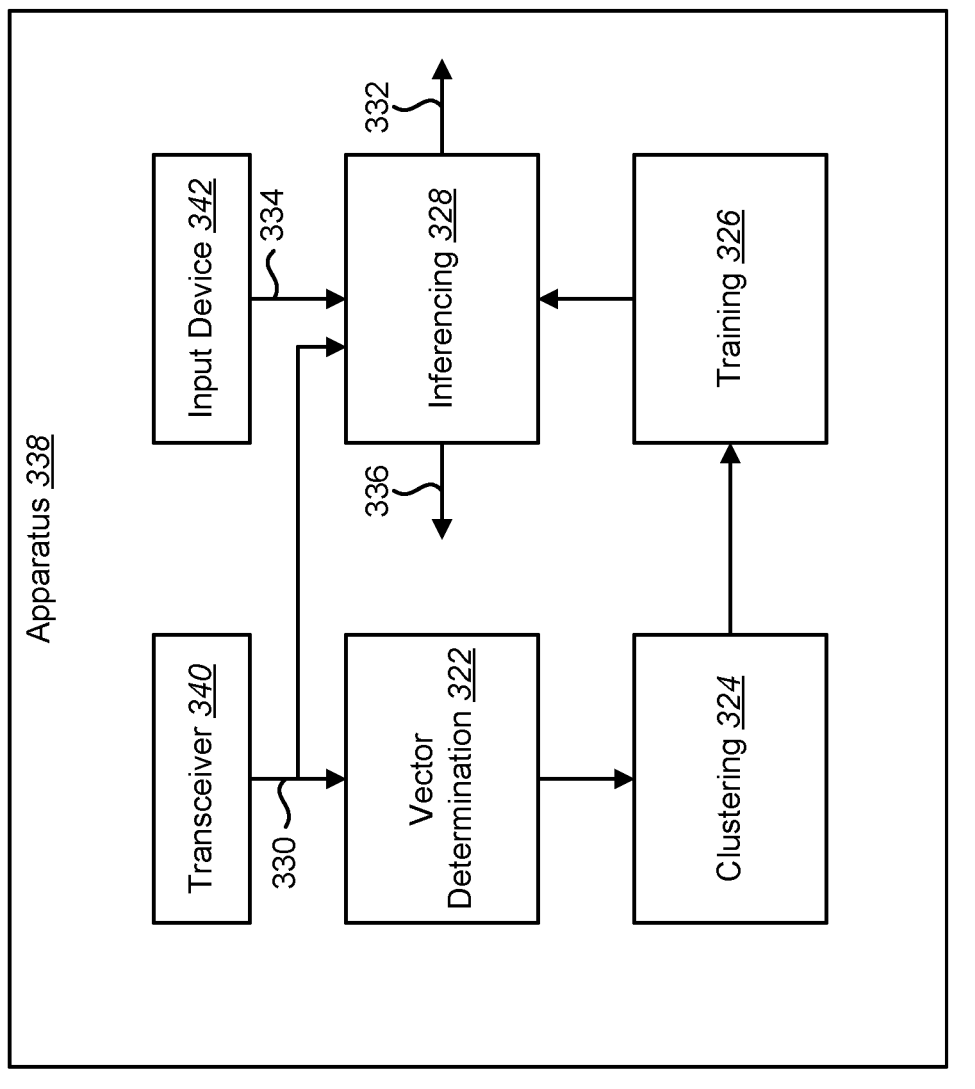
FIG. 3 is a block diagram of examples of functions that may be performed to provide location inferencing in accordance with some examples of the techniques described herein.

FIG. 3 is a block diagram of examples of functions that may be performed to provide location inferencing in accordance with some examples of the techniques described herein. FIG. 3 illustrates an example of an apparatus 338. The apparatus 338 may be an example of the electronic device 102 described in FIG. 1. In some examples, a function described in FIG. 3 may be performed by the electronic device 102 described in FIG. 1. In some examples, a function described in FIG. 3 may be performed by hardware (e.g., a circuit) or by a combination of a processor with instructions. In some examples, the apparatus 338 may include a circuit(s), a processor(s), or a combination thereof to perform a function described in FIG. 3. In some examples, the apparatus 338 may include a vector determination module 322, a clustering module 324, a training module 326, an inferencing module 328, an input device 342, or a combination thereof.

In some examples, the apparatus 338 may include a transceiver 340 (e.g., WLAN transceiver, Wi-Fi transceiver, cellular receiver, Bluetooth transceiver, etc., or a combination thereof) to receive identifier data 330. In some examples, the identifier data 330 may be provided to the vector determination module 322, to the inferencing module 328, or to a combination thereof. For example, the apparatus 338 may receive identifier data 330 indicating an identifier of a transmitting device (e.g., router(s), base station(s), etc.). In some examples, a combination of different transceivers (e.g., cellular and Wi-Fi) may be used to increase accuracy or robustness. The identifier data 330 may include or indicate an identifier from an RF signal from a scan(s). For instance, the apparatus 338 may receive identifier data as the apparatus 338 moves from location to location and as the apparatus 338 returns to a previously visited location(s).

The vector determination module 322 may determine a fingerprint vector(s) based on the identifier data 330. In some examples, vector determination may be performed as described in FIG. 1. In some examples, the apparatus 338 may add an identifier to an identifier set, may set a value corresponding to the identifier, or may perform a combination thereof based on whether the identifier is observed at a time. The fingerprint vector(s) may be provided to the clustering module 324.

The clustering module 324 may generate a data cluster(s) based on the fingerprint vector(s). In some examples, clustering may be performed as described in FIG. 1. For instance, the apparatus 338 may perform unsupervised (e.g., DBSCAN) clustering to form a data cluster(s) from the fingerprint vectors. Observations (e.g., identifiers) that correspond to a location may form a cluster. The data cluster(s) may be provided to the training module 326.

The training module 326 may train a classifier based on the data cluster(s). In some examples, training may be performed as described in FIG. 1. For instance, the training module 326 may train a classifier (e.g., one-class SVM classifier) for each data cluster. The classifier(s) may be provided to the inferencing module 328.

The inferencing module 328 may utilize the classifier(s) to infer whether identifier data 330 indicates a location. In some examples, inferencing may be performed as described in FIG. 1. For instance, the classifier(s) may be added to an ensemble machine learning model. The identifier data 330 may be utilized as an input to the ensemble machine learning model. For instance, the identifier data 330 may be provided to the classifiers of the ensemble machine learning model. In some examples, the classifiers may each produce an indicator 332 that indicates whether the identifier data 330 corresponds to a previously generated cluster, classifier, location, or a combination thereof. In some examples, in a case that an inferred cluster, classifier, location, or a combination thereof corresponds to an unlabeled location, the inferencing module 328 may request or receive a label 334 (from an input device 342, for instance).

In some examples, the inferencing module 328 may produce a marking 336 to mark identifiers that have been recognized. For instance, identifiers may be marked in memory. In some examples, once a new one-class classifier is added to the ensemble model, that one-class classifier may be run on the pool of identifier data. The one-class classifier may return a "1" when the classifier recognizes that the scan belongs to its class. Otherwise, the one-class classifier may return a "0." When the classifier returns a 1, the identifiers may be marked by attaching the classifier's class identity to the identifiers of that scan. Marking may be performed to provide unmarked scans to the clustering module 324 (e.g., to avoid providing recognized scans to the clustering module 324), since a classifier may already exist in the ensemble model for marked identifiers (e.g., a scan).

FIG. 4 is a block diagram illustrating an example of a computer-readable medium 452 for location inferencing. The computer-readable medium 452 may be a non-transitory, tangible computer-readable medium 452. The computer-readable medium 452 may be, for example, RAM, EEPROM, a storage device, an optical disc, and the like. In some examples, the computer-readable medium 452 may be volatile memory, non-volatile memory, or a combination thereof. Examples of the computer-readable medium 452 may include DRAM, EEPROM, MRAM, PCRAM, memristor, flash memory, or the like. In some examples, the computer-readable medium 452 described in FIG. 4 may be an example of the memory 110 described in FIG. 1. In some examples, code (e.g., data, executable code, instructions, or a combination thereof) of the computer-readable medium 452 may be transferred or loaded to the memory of an electronic device.

The computer-readable medium 452 may include code (e.g., data, executable code, instructions). In some examples, the computer-readable medium 452 may include detection indicator assignment instructions 454, data cluster determination instructions 456, training instructions 458, inferencing instructions 460, or a combination thereof.

The detection indicator assignment instructions 454 may be instructions when executed cause a processor of an electronic device to assign a detection indicator (e.g., value) for an identified wireless signal source in an identifier set. In some examples, assigning a detection indicator may be performed as described in FIG. 1, FIG. 3, or a combination thereof. For instance, an electronic device may scan for an RF signal, where each received RF signal may indicate an identifier. The electronic device may assign a positive detection indicator (e.g., '1') for each observed identifier that matches an identifier in the identifier set. A negative detection indicator (e.g., '0') may be assigned for each identifier in the identifier set that is not observed. In some examples, the identifier set may include a MAC address. For instance, a MAC address may be an example of an identifier. For example, each identifier in the identifier set may be a MAC address.

In some examples, the identifier set may include a signal strength measurement. For instance, an electronic device (e.g., wireless communication device, transceiver) may take a signal strength measurement corresponding to each received RF signal. Examples of a signal strength measurement may include a received signal strength indicator (RSSI), reference signal received power (RSRP), signal-to-noise ratio (SNR), signal-to-interference-plus-noise ratio (SINR), etc. In some examples, the signal strength may be used as values in a fingerprint. For instance, instead of using '1' or '0' to indicate whether a router appeared in a scan, the value may be each router's signal strength. The electronic device may store the signal strength measurement(s) corresponding to the identifier(s) in the identifier set.

The data cluster determination instructions 456 may be instructions when executed cause a processor of an electronic device to determine, using a first machine learning model, a data cluster based on the identifier set, where the data cluster corresponds to a location. In some examples, determining a data cluster using a first machine learning model may be performed as described in FIG. 1, FIG. 3, or a combination thereof. For instance, the first machine learning model may be a clustering model (e.g., DBSCAN or another clustering model).

The training instructions 458 may be instructions when executed cause a processor of an electronic device to train a one-class SVM classifier based on the data cluster. In some examples, training a one-class SVM classifier may be performed as described in FIG. 1, FIG. 3, or a combination thereof.

The inferencing instructions 460 may be instructions when executed cause a processor of an electronic device to infer, using a second machine learning model that includes the one-class SVM classifier, the location based on a received wireless signal. In some examples, inferring the location using a second machine learning model may be performed as described in FIG. 1, FIG. 3, or a combination thereof. For instance, the second machine learning model may be an ensemble model (e.g., an ensemble model including multiple one-class SVM classifiers or another model).

Figure 5:
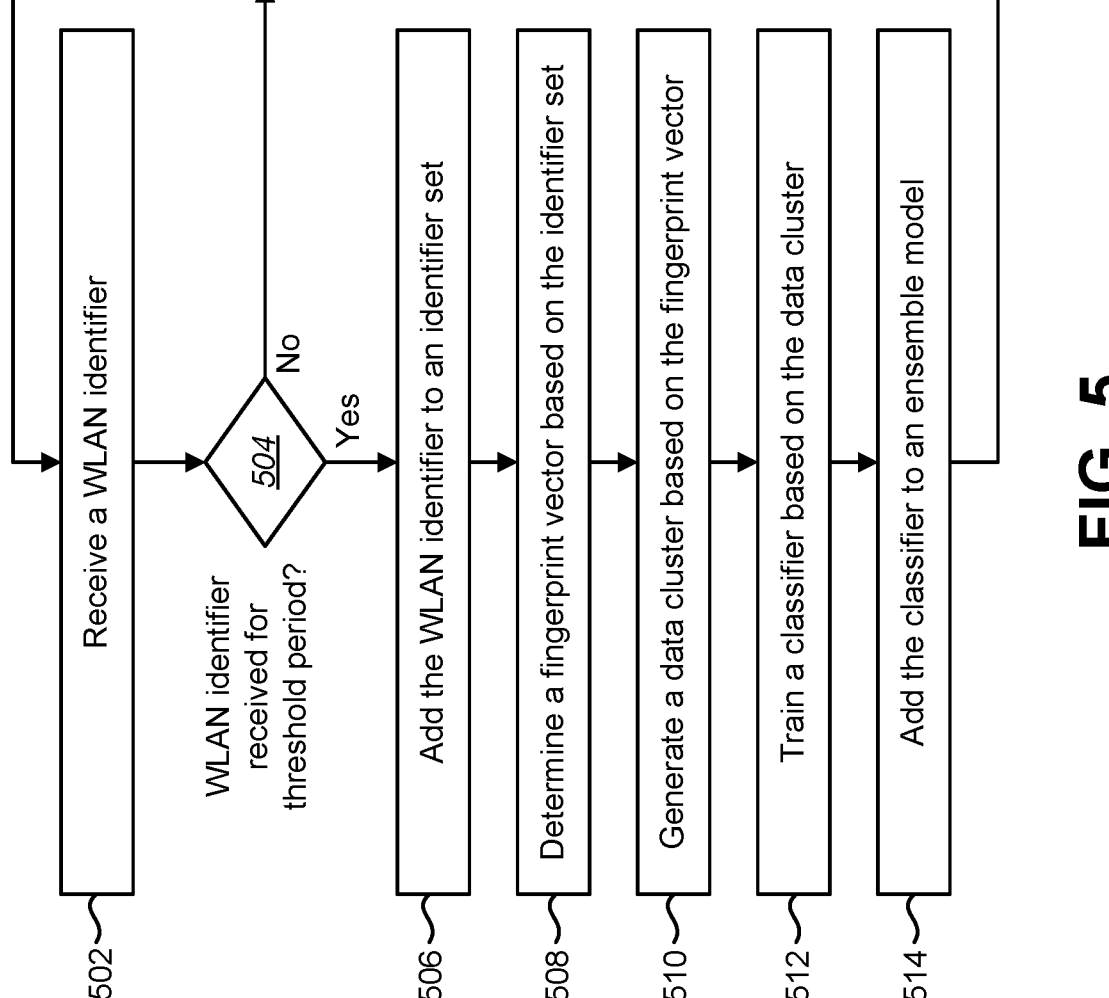
FIG. 5 is a flow diagram illustrating an example of a method for training a classifier.

FIG. 5 is a flow diagram illustrating an example of a method 500 for training a classifier. For instance, the method 500 may provide an approach for training a classifier for inferring electronic device location. The method 500 or an element(s) of the method 500 may be performed by an electronic device. In some examples, the method 500 may be performed by the electronic device 102 described in FIG. 1, the apparatus 338 described in FIG. 3, or a combination thereof, any of which may be referred to generally as an "electronic device" in FIG. 5. In some examples, the method 500 may be performed using an instruction(s) described in FIG. 4.

At 502, an electronic device may receive a WLAN identifier. In some examples, receiving a WLAN identifier may be performed as described in FIG. 1, FIG. 3, FIG. 4, or a combination thereof. For instance, the electronic device may receive a WLAN identifier from a router (e.g., Wi-Fi router) using a WLAN transceiver.

At 504, the electronic device may determine whether the WLAN identifier has been received for a threshold period. In some examples, this may be accomplished as described in FIG. 1. For example, the electronic device may determine the WLAN identifier has been repeatedly received for a quantity of (e.g., all or a proportion of) periodic scans within the threshold period. In a case that the WLAN identifier is not received for the threshold period, the electronic device may return to receiving a WLAN identifier (e.g., the same or a different WLAN identifier) at 502.

In a case that the WLAN identifier is received for the threshold period, the electronic device may add the WLAN identifier to an identifier set at 506. In some examples, this may be accomplished as described in FIG. 1. For instance, the electronic device may add the WLAN identifier to a data structure (e.g., table, vector, list, etc.) in memory.

At 508, the electronic device may determine a fingerprint vector based on the identifier set. In some examples, determining the fingerprint vector may be performed as described in FIG. 1, FIG. 3, or a combination thereof. For instance, the electronic device may determine a fingerprint vector by assigning a value to an observed WLAN identifier at a time (e.g., received from a scan).

At 510, the electronic device may generate a data cluster based on the fingerprint vector. In some examples, generating a data cluster may be performed as described in FIG. 1, FIG. 3, FIG. 4, or a combination thereof. For instance, the electronic device may generate the data cluster using unsupervised clustering.

At 512, the electronic device may train a classifier based on the data cluster. In some examples, training a classifier based on the data cluster may be performed as described in FIG. 1, FIG. 3, FIG. 4, or a combination thereof.

At 514, the electronic device may add the classifier to an ensemble model. In some examples, adding the classifier to an ensemble model may be performed as described in FIG. 1, FIG. 3, FIG. 4, or a combination thereof. The classifier may be added to the ensemble model to infer a location corresponding to the data cluster.

In some examples, the electronic device may label the location corresponding to a data cluster. In some examples, labeling the location corresponding to the data cluster may be performed as described in FIG. 1, FIG. 3, or a combination thereof.

Figure 6:
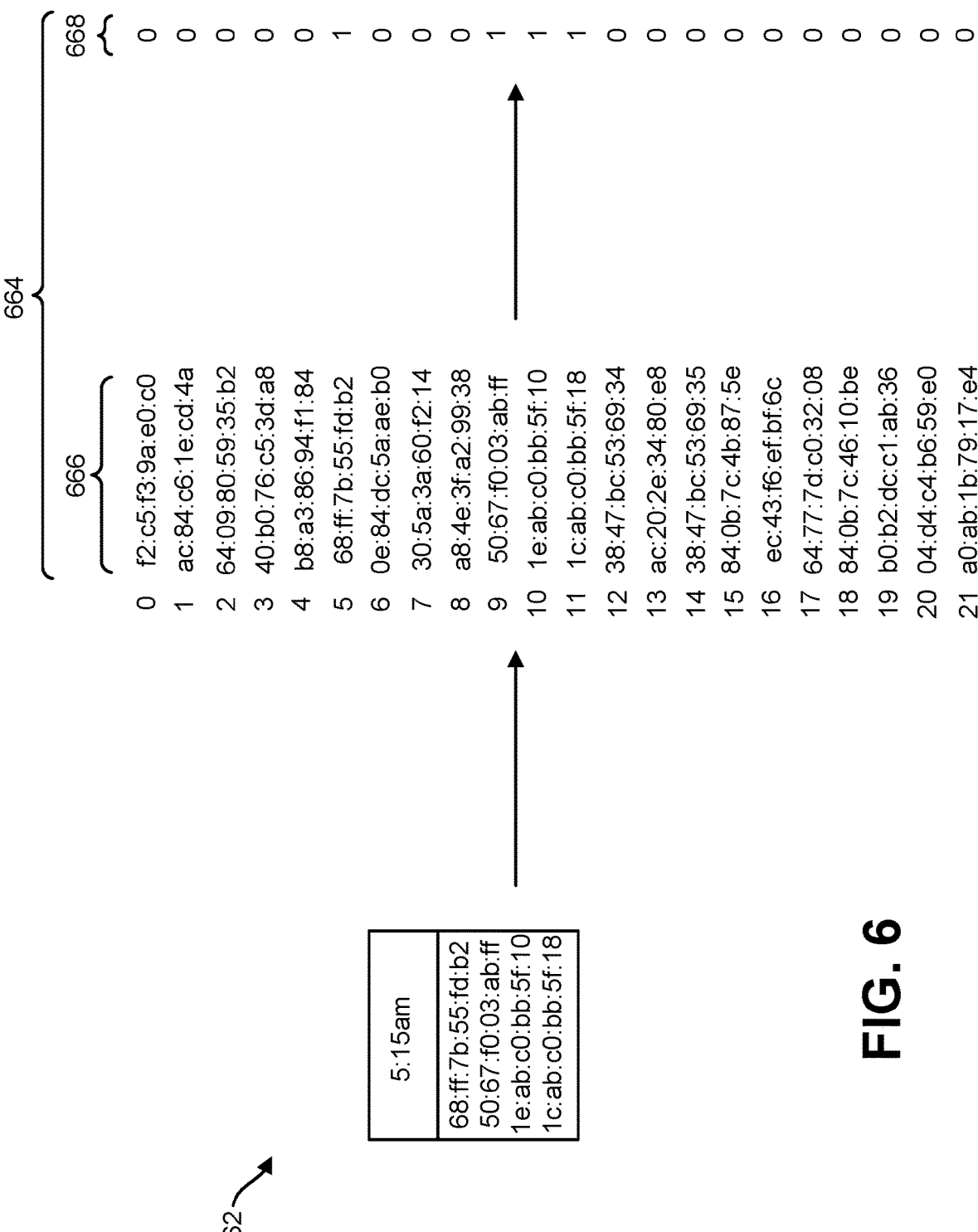
FIG. 6 is a diagram illustrating an example of converting observed identifiers to a fingerprint vector.

FIG. 6 is a diagram illustrating an example of converting observed identifiers 662 to a fingerprint vector 664. As illustrated in FIG. 6, four identifiers 662 (e.g., MAC addresses) were observed in a scan occurring at 5:15 am. The four observed identifiers 662 match four identifiers in an identifier set 666. As described herein, values 668 that are associated with the identifier set 666 may be set according to the observed identifiers 662. For instance, the four values corresponding to the four observed identifiers 662 may be set to '1' and the remaining values may be '0' to produce the fingerprint vector 664. In some examples, a fingerprint vector may include a vector of values (e.g., values 668), values and identifiers (e.g., values 668 and identifier set 666), other information, or a combination thereof (e.g., values 668, identifier set 666, associated signal strength measurements, or a combination thereof).

Some of the techniques described herein may reduce user burden. For instance, some of the techniques may be performed without user demonstration. Some of the techniques may be performed without up-front measurements or data. For instance, some of the techniques may be performed without prior data about the environment (e.g., without an initial Wi-Fi hotspot database). Some of the techniques may be performed without an Internet connection. This may reduce bandwidth consumption and increase user privacy. For instance, sensitive data may remain on the device without being shared with a remote server. Some of the techniques may enable learning new locations over time, where a database may be scaled up organically.

As used herein, items described with the term "or a combination thereof" may mean an item or items. For example, the phrase "A, B, C, or a combination thereof" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operation(s), function(s), aspect(s), or element(s) of the examples described herein may be omitted or combined.

The invention claimed is:

1. An electronic device, comprising:
   a wireless communication device;
   a transceiver of the wireless communication device to receive radio frequency (RF) signals; and
   a processor to:
     generate a data cluster based on the RF signals, wherein the data cluster corresponds to a location of the electronic device;
     discard an identifier of an RF signal that is observed for less than a threshold period;
     determine a classifier based on the data cluster; and
     infer, via a machine learning model, the location of the electronic device based on the classifier.

2. The electronic device of claim 1, wherein the processor is to store an identifier of an RF signal associated with a value indicating whether the identifier was observed at a time.

3. The electronic device of claim 1, wherein the processor is to train a one-class Support Vector Machine (SVM) for the data cluster to determine the classifier.

4. The electronic device of claim 1, wherein the processor is to add the classifier to the machine learning model.

5. The electronic device of claim 1, wherein the machine learning model is an ensemble machine learning model.

6. The electronic device of claim 1, wherein the processor is to determine whether the location has a corresponding label.

7. The electronic device of claim 6, wherein the processor is to produce a label request in response to determining that the location does not have a corresponding label.

8. The electronic device of claim 7, further comprising an input device to receive a label, wherein the processor is to associate the label with the location.

9. An apparatus, comprising:
   a wireless local area network (WLAN) transceiver to receive a WLAN identifier; and
   a processor to:
     add the WLAN identifier to an identifier set in response to determining that the WLAN identifier has been received for a threshold period;
     determine a fingerprint vector based on the identifier set;
     generate a data cluster based on the fingerprint vector;
     train a classifier based on the data cluster; and
     add the classifier to an ensemble model to infer a location corresponding to the data cluster.

10. The apparatus of claim 9, wherein the processor is to label the location corresponding to the data cluster.

11. The apparatus of claim 9, wherein the processor is to generate the data cluster using unsupervised clustering.

12. A non-transitory tangible computer-readable medium comprising instructions when executed cause a processor of an electronic device to:

assign a detection indicator for an identified wireless signal source in an identifier set;

determine, using a first machine learning model, a data cluster based on the identifier set, wherein the data cluster corresponds to a location;

train a one-class support vector machine (SVM) classifier based on the data cluster; and infer, using a second machine learning model that includes the one-class SVM classifier, the location based on a received wireless signal.

13. The non-transitory tangible computer-readable medium of claim 12, wherein the identifier set includes a media access control (MAC) address.

14. The non-transitory tangible computer-readable medium of claim 12, wherein the identifier set includes a signal strength measurement.

* * * * *